(12) United States Patent
Hokiyama (10) Patent No.: US 10,572,182 B2
(45) Date of Patent: Feb. 25, 2020

(54) IMAGE FORMING APPARATUS, IMAGE FORMING SYSTEM, CONTROL METHOD, AND RECORDING MEDIUM

(71) Applicant: CANON KABUSHIKI KAISHA, Tokyo (JP)

(72) Inventor: Takeshi Hokiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/855,415

(22) Filed: Dec. 27, 2017

(65) Prior Publication Data

US 2018/0188995 A1 Jul. 5, 2018

(30) Foreign Application Priority Data

Jan. 5, 2017 (JP) .................................. 2017-000501

(51) Int. Cl.
*G06F 3/06* (2006.01)
*H04N 1/00* (2006.01)
*G06F 3/12* (2006.01)

(52) U.S. Cl.
CPC .......... *G06F 3/0652* (2013.01); *G06F 3/0604* (2013.01); *G06F 3/067* (2013.01); *G06F 3/0647* (2013.01); *G06F 3/1203* (2013.01); *G06F 3/1207* (2013.01); *G06F 3/1236* (2013.01); *G06F 3/1273* (2013.01); *G06F 3/1284* (2013.01); *G06F 3/1285* (2013.01); *H04N 1/00228* (2013.01); *H04N 1/00408* (2013.01); *G06F 3/1222* (2013.01)

(58) Field of Classification Search
CPC ...................................................... G06F 3/0652
USPC ........................................................ 358/1.15
See application file for complete search history.

(56) References Cited

U.S. PATENT DOCUMENTS

| 2009/0040543 A1* | 2/2009 | Kimura | G06K 15/005 358/1.9 |
| 2010/0211951 A1* | 8/2010 | Ito | G06F 3/1207 718/100 |
| 2011/0051158 A1* | 3/2011 | Yamahata | G06F 3/1204 358/1.9 |
| 2012/0117113 A1* | 5/2012 | Fujisawa | G06F 17/30144 707/771 |
| 2015/0062639 A1* | 3/2015 | Goto | H04N 1/00954 358/1.15 |
| 2017/0132500 A1* | 5/2017 | Takamoto | G06K 15/1809 |

FOREIGN PATENT DOCUMENTS

JP 2014-146206 A 8/2014

* cited by examiner

*Primary Examiner* — Jacky X Zheng
(74) *Attorney, Agent, or Firm* — Canon U.S.A., Inc. IP Division (57) ABSTRACT

In a case where the automatic transfer of an audit log from an image forming apparatus to an external apparatus is set to enabled, the function of deleting the transmitted audit log transmitted based on a user operation is disabled.

18 Claims, 7 Drawing Sheets

IMAGE FORMING APPARATUS, IMAGE FORMING SYSTEM, CONTROL METHOD, AND RECORDING MEDIUM

BACKGROUND

Field

The following exemplary embodiments relate to an image forming apparatus including the function of transferring an audit log to an external apparatus and the function of deleting an audit log.

Description of the Related Art

Conventionally, some multifunction peripherals (MFPs) are known to include the function of recording the operation of the MFP as a log for tracking the use state of the device, audit, or preventing information leakage. Such a log is typically referred to as an "audit log". When information leakage or unauthorized access to the device is detected, referencing an audit log enables checking for this illicit operation. Thus, an audit log needs to be recorded, and the manner of managing audit log data is important.

The Japanese Patent Application Laid-Open No. 2014-146206 discusses an MFP including the function of transferring, via a push method, an audit log to a pre-set transfer destination, such as an MFP manufacturer's log management server, and the function of accessing the MFP from the log management server and acquiring, through a pull method, an audit log that has not yet been transferred.

There can be a case where an audit log is deleted without being transmitted to an external server, such as where an audit log that has not yet been transmitted to an external server is deleted from an MFP based on an instruction from a user. Thus, there is a possibility that an audit log is not accumulated/stored in an external server.

SUMMARY

According to an aspect of the present invention, an image forming apparatus includes a memory storing a set of instructions and at least one processor that executes the set of instructions to store an audit log, set an automatic transmission function for automatically transmitting the stored audit log to an external apparatus to enabled or disabled, set a deletion function for deleting the stored audit log to enabled or disabled, the audit log having been transmitted to the predetermined external apparatus or another external apparatus in accordance with an operation of a user, and disable, in a case where the automatic transmission function is enabled, the deletion function.

Further features will become apparent from the following description of exemplary embodiments with reference to the attached drawings.

DESCRIPTION OF THE EMBODIMENTS

Exemplary embodiments will be described below with reference to the drawings.

Figure 1:
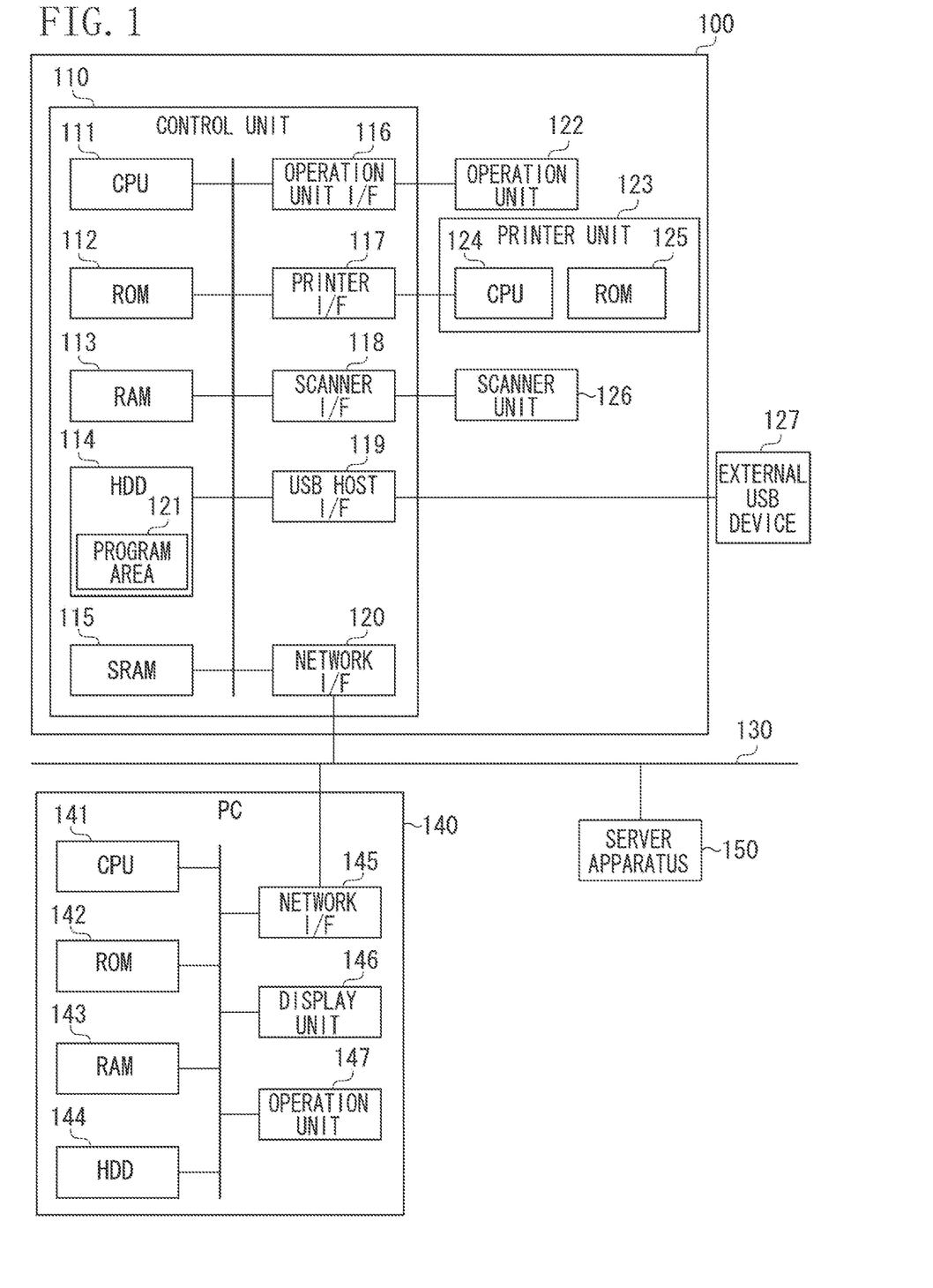
FIG. 1 is a diagram illustrating an image forming system.

FIG. 1 is a diagram illustrating an image forming system according to a first exemplary embodiment. The image forming system includes an image forming apparatus 100, a personal computer (PC) 140, and a server apparatus 150. The image forming apparatus 100 includes the function of recording an audit log corresponding to an execution result of individual function into a storage unit, such as a hard disk drive (HDD) 114, for the purpose of a security audit.

The server apparatus 150 receives the audit log from the image forming apparatus 100 and accumulates the audit log. The server apparatus 150 is an example of an external apparatus. The PC 140 is an apparatus for receiving a user operation. The PC 140 is an example of an information processing apparatus.

Next, the hardware configuration of the image forming apparatus 100 is described. A central processing unit (CPU) 111 loads a control program (a first program) stored in a read-only memory (ROM) 112 and a program stored in a program area 121 in the HDD 114 into a random-access memory (RAM) 113 and executes the programs. The functions and the processing of the image forming apparatus 100 described below are realized by the CPU 111 reading a program stored in the ROM 112 or the HDD 114 and executing the program.

The HDD 114 stores print data received from the PC 140 via a network interface (I/F) 120. The programs to be executed by the CPU 111 include a below-described print application program (AP). The print data stored in the HDD 114 is converted, by the print AP, into image data that can be printed by a printer unit 123. The HDD 114 also stores image data that can be printed by the printer unit 123. The programs to be executed by the CPU 111 include a scan AP. With the scan AP, the image data is read by a scanner unit 126, and the read image data is transferred to the HDD 114.

An operation unit I/F 116 is an I/F for transmitting to the CPU 111 an instruction input by a user of the image forming apparatus 100 via an operation unit 122. The operation unit I/F 116 receives, from the CPU 111, an instruction to switch information to be displayed on the operation unit 122 and transmits the instruction to the operation unit 122.

A printer I/F 117 is an I/F for connecting a control unit 110 and the printer unit 123. Based on the image data transferred from the HDD 114 via the printer I/F 117, the printer unit 123 performs printing on a sheet. The printer unit 123 (a printing unit) includes a CPU 124 and a ROM 125. The CPU 124 executes a program (a second program) stored in the ROM 125, thereby causing the printer unit 123 to execute various operations involved in a printing process.

A scanner I/F 118 is an I/F for connecting the control unit 110 and the scanner unit 126. The scanner unit 126 (an input unit for inputting image data) reads an image of a document as image data, using a line sensor including, for example, a charge-coupled device (CCD). The scanner unit 126 then transfers the read image data to the HDD 114 via the scanner I/F 118. The image data transferred to and stored in the HDD 114 can be printed by the printer unit 123. The image data read by the scanner unit 126 is printed by the printer unit 123, thereby enabling a duplication (copying) process.

A Universal Serial Bus (USB) host I/F 119 is an I/F for connecting the control unit 110 and an external USB device 127. The external USB device 127 is, for example, a USB memory or a USB keyboard. The external USB device 127 can also be a USB memory that stores a program that is downloaded into a file storage area of the ROM 112. The network I/F 120 connects the control unit 110 to a local area network (LAN) 130, and the control unit 110 communicates with the PC 140 or the server apparatus 150 on the LAN 130. A static random-access memory (SRAM) 115 is used to store a setting value of the image forming apparatus 100 required to execute the first program.

As described above, the image forming apparatus 100 includes the function of recording an audit log, where the recorded log is stored in the HDD 114. There is an upper limit of the number of audit logs that can be stored in the HDD 114. When the upper limit is reached, in order to store a new audit log, the oldest audit log is overwritten/deleted.

The PC 140 includes a CPU 141, a ROM 142, a RAM 143, an HDD 144, a network I/F 145, a display unit 146, and an operation unit 147. The CPU 141, the ROM 142, the RAM 143, the HDD 144, and the network I/F 145 are similar to the CPU 111, the ROM 112, the RAM 113, the HDD 114, and the network I/F 120, respectively, of the image forming apparatus 100. The display unit 146 displays various pieces of information. The operation unit 147 receives a user operation. The hardware configuration of the server apparatus 150 is similar to that of the PC 140.

Figure 2:
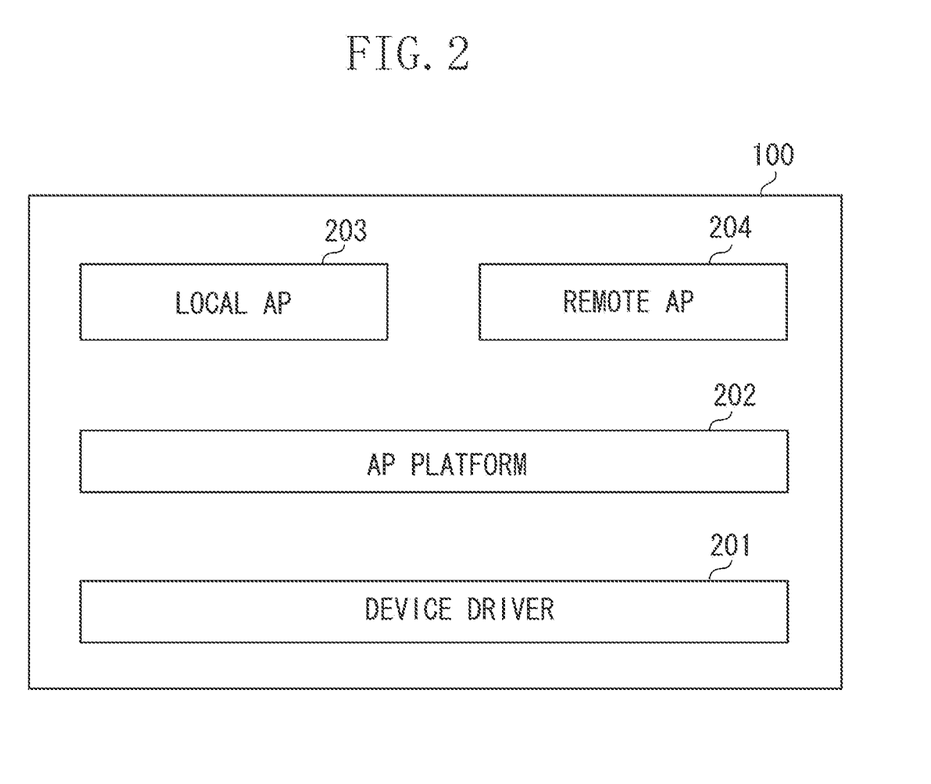
FIG. 2 is a diagram illustrating a software configuration of an image forming apparatus.

FIG. 2 is a diagram illustrating the software configuration of the image forming apparatus 100. A device driver 201 is a device driver for controlling various pieces of hardware. An application (AP) platform 202 is an application platform for managing the start of an application or a service that operates on the image forming apparatus 100. The AP platform 202 provides the following application programming interfaces (APIs) for an application or a service:

An API for exchanging data between an application and a service

An API for using the function of hardware via a device driver group from an application or a service The AP platform 202 can be configured including an operating system, such as Linux®, a Java® virtual machine, and an Open Service Gateway Initiative (OSGi) framework.

A local AP 203 is an application for displaying a user interface on the operation unit 122 of the image forming apparatus 100. The local AP 203 includes a copy application for providing a copy function, and a scan application for providing a scan function.

A remote AP 204 provides a user interface obtained by describing in HyperText Markup Language (HTML) a web browser that operates on the PC 140. The remote AP 204 includes a direct print application for providing a print function for printing a Portable Document Format (PDF) format document, and an audit log management application for providing a setting function for setting an audit log. The audit log management application provides a push transfer function and a pull transfer function.

A push transfer and a pull transfer are described below. A push transfer is the function in which the image forming apparatus 100 periodically automatically transfers an audit log stored in the image forming apparatus 100. In the present exemplary embodiment, the image forming apparatus 100 executes the push transfer of an audit log at a set time once a day. In a case where the push transfer at the set time fails, the image forming apparatus 100 executes a plurality of error retries at regular intervals, such as every five minutes.

In a case where the error retries also fail, the image forming apparatus 100 performs control to perform the push transfer at a set time the next day.

The time intervals and the timing of the periodic transfer of the audit log are not limited to those in the exemplary embodiment. The periodic transfer timing is set by a user, such as an administrator. With the automatic transfer function, all the audit logs of the image forming apparatus 100 can be accumulated in the server apparatus 150. Thus, a user who wishes to preserve all the audit logs uses this function.

In a case where a push transfer is enabled, the image forming apparatus 100 executes a push transfer at the timing when the number or the amount of data of audit logs stored in the image forming apparatus 100 comes close to its upper limit, such as the timing when the number of audit logs stored in the image forming apparatus 100 reaches 90% of the upper limit number of audit logs. Consequently, even in a case where many audit logs occur that the upper limit of the number of stored audit logs can be reached before the transfer timing arrives, the image forming apparatus 100 can transfer all the audit logs to the server apparatus 150 without any audit logs not being transferred.

If completing the transfer of the audit log with this automatic transfer function, the image forming apparatus 100 deletes the audit log from the image forming apparatus 100. However, as described below, in the state where the automatic transfer function is set to enabled, the image forming apparatus 100 performs control not to delete an audit log based on a user operation. This process will be described in detail below.

Figure 3:
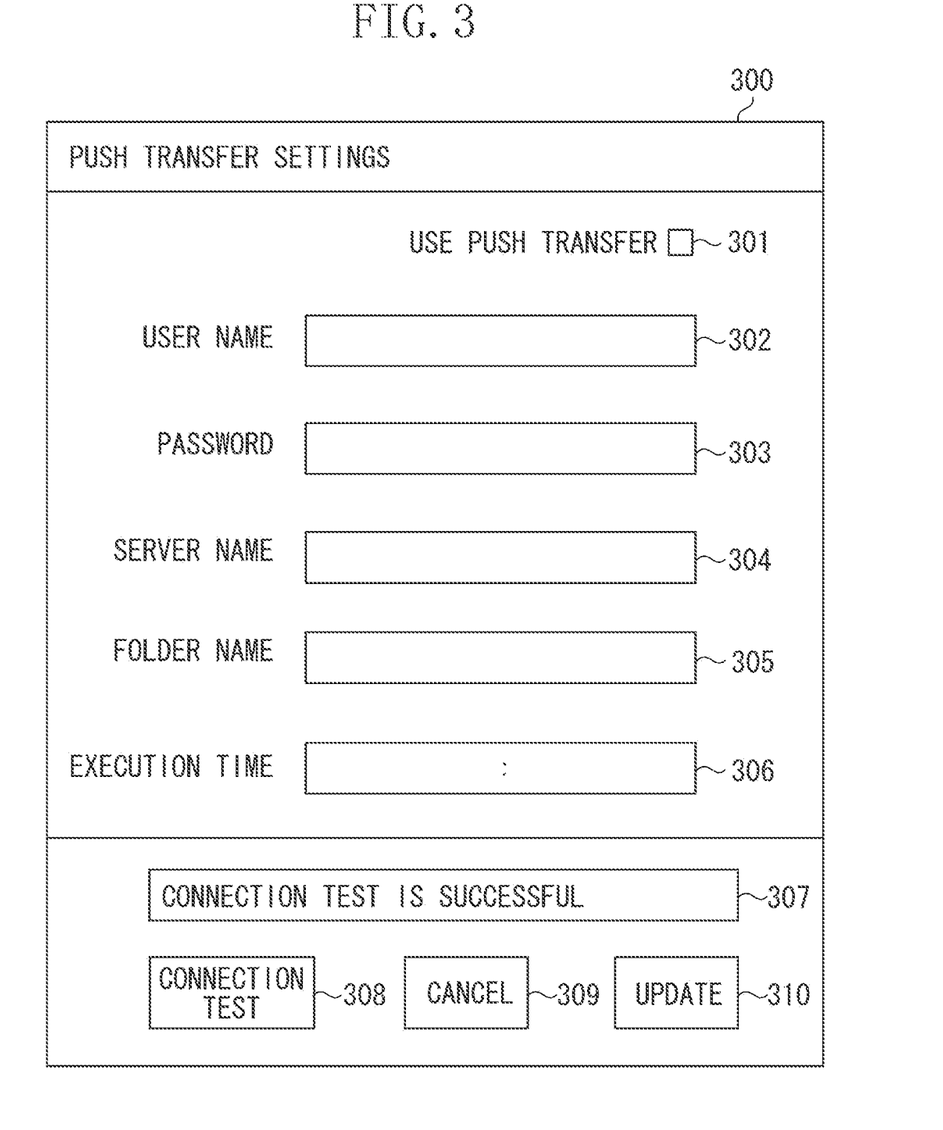
FIG. 3 is a diagram illustrating an example of a setting screen of a push transfer function.

FIG. 3 is a diagram illustrating an example of a setting screen for the push transfer function. A setting screen 300 is displayed on the display unit 146 of the PC 140. To use a push transfer, the user selects an entry field 301. Entry fields 302 to 305 are fields in which information about a transmission destination required to transfer an audit log to the server apparatus 150 is input. An entry field 306 is a field in which the time to execute the push transfer of the audit log is input. If the user presses a connection test button 308, the PC 140 transmits an instruction to the image forming apparatus 100. The image forming apparatus 100 tests whether the image forming apparatus 100 can connect to the transmission destination input in the entry fields 302 to 305. The image forming apparatus 100 then returns a result of the test to the PC 140. The test result is displayed in a message field 307.

If the user presses an update button 310, setting values input in the entry fields 301 to 306 are transmitted to the image forming apparatus 100 and stored in the HDD 114. If the user presses a cancel button 309, push transfer settings are not changed in the image forming apparatus 100, and a setting process for setting the push transfer function ends.

Figure 4:
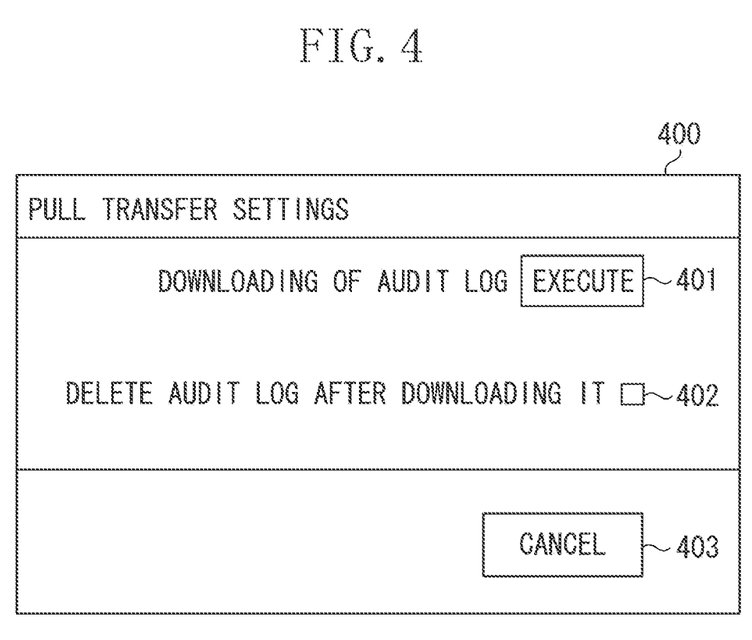
FIG. 4 is a diagram illustrating an example of a setting screen of a pull transfer function.

Next, a pull transfer is described. A pull transfer is the function in which a user, such as an administrator, operates the PC 140 to transmit to the image forming apparatus 100 a transfer instruction to transfer an audit log, thereby transferring (transmitting) the audit log from the image forming apparatus 100 to the PC 140. FIG. 4 is a diagram illustrating an example of a setting screen for the pull transfer function.

A setting screen 400 is displayed on the display unit 146 of the PC 140. If the user presses an execute button 401 for executing the downloading of an audit log on the setting screen 400, the PC 140 transmits to the image forming apparatus 100 a transfer instruction to transfer an audit log and receives the audit log from the image forming apparatus 100. In a case where the user presses the execute button 401 in the state where a check box 402 is selected, the image forming apparatus 100 transfers an audit log from the image forming apparatus 100 to the PC 140 and then deletes the audit log from the image forming apparatus 100. In such a manner, a deletion function for deleting an audit log transmitted based on an operation of the user from a storage unit (e.g., the HDD 114) of the PC 140 can be set to enabled or disabled. In other words, if the check box 402 is selected, the deletion function can be set to enabled. If the check box 402 is not selected, the deletion function can be set to disabled. The setting method is not limited to the check box 402, and can be a pull-down menu or a method for selecting an on or off state.

The image forming apparatus 100 according to the present exemplary embodiment can also execute a pull transfer in a case where the push transfer function is set to enabled. However, in a case where an audit log is deleted after being subjected to a pull transfer, there is a possibility that the audit log that has not yet been transferred both in the automatic transfer function and the pull transfer function is deleted, and the audit log in question is not accumulated/stored in the server apparatus 150. In response, in a case where a push transfer is set to enabled, the image forming apparatus 100 according to the present exemplary embodiment restricts the deletion of an audit log.

Figure 5:
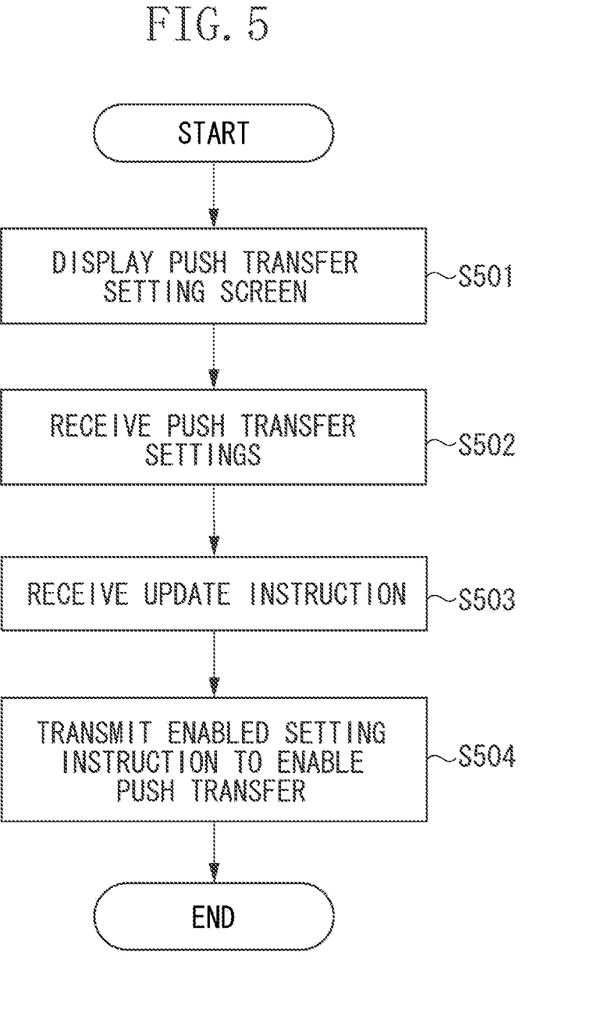
FIG. 5 is a flowchart illustrating a push transfer setting process.

FIG. 5 is a flowchart illustrating a push transfer setting process performed by the PC 140. In step S501, based on a user operation, the CPU 141 of the PC 140 performs control to display a push transfer setting screen on the display unit 146. This displays the push transfer setting screen 300 illustrated in FIG. 3 on the display unit 146. Next, in step S502, based on a user operation, the CPU 141 receives information regarding the settings of a push transfer. The user inputs a server name 304 and a folder name 305 of the server apparatus 150, which is the transmission destination of an audit log, and a user name 302, a password 303, and a push transfer execution time 306, which are required for a connection, and selects the entry field (check box) 301. If the check box 301 is selected, the CPU 141 receives information input to the setting screen 300 at this time as information regarding the settings of the push transfer.

Next, in step S503, in response to the user pressing the update button 310, the CPU 141 receives an update instruction. Next, in step S504, the CPU 141 transmits to the image forming apparatus 100 an enabled setting instruction to enable the push transfer. Then, the push transfer setting process ends. In a case where the enabled setting instruction is received, the image forming apparatus 100 writes a setting for enabling the push transfer to a setting file in the HDD 114.

Figure 6:
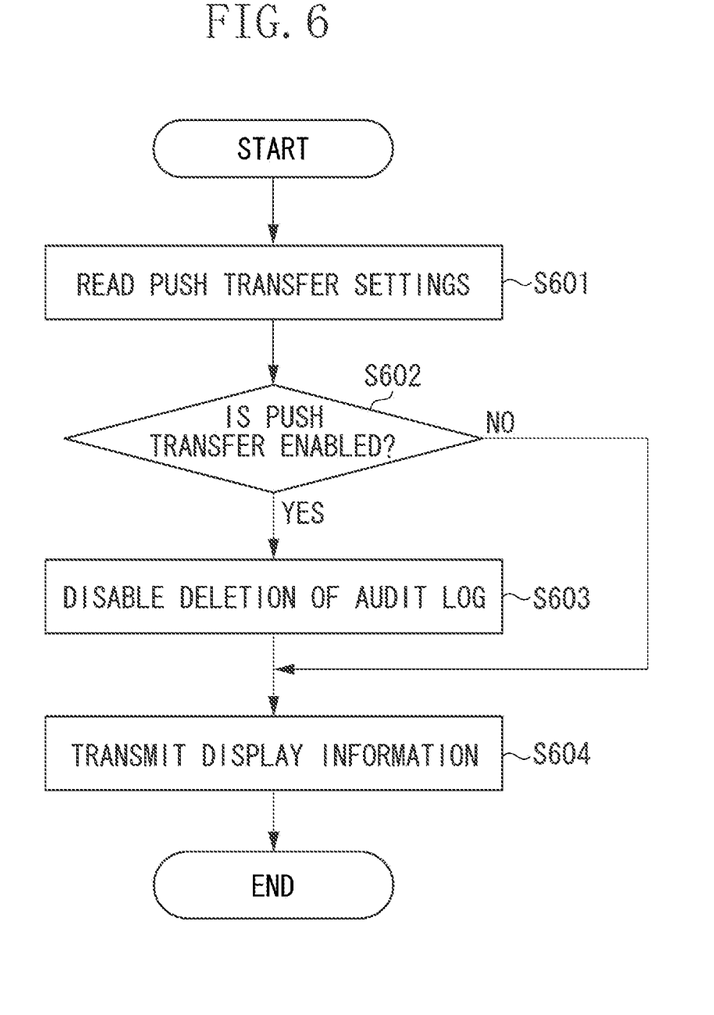
FIG. 6 is a flowchart illustrating an audit log deletion process.

FIG. 6 is a flowchart illustrating an audit log deletion process performed by the image forming apparatus 100. In step S601, the CPU 111 reads the settings of a push transfer from the HDD 114. Next, in step S602, the CPU 111 checks whether the push transfer has been set to enabled. In a case where the push transfer is set to enabled (Yes in step S602), the processing proceeds to step S603. In a case where the push transfer is set to disabled (No in step S602), the processing proceeds to step S604. In step S603, the CPU 111 disables the function regarding the deletion of an audit log based on a user operation. This process is an example of a deletion management process.

Specifically, in step S603, the CPU 111 changes display information for the setting screen 400 so that the user cannot select the check box 402 on the setting screen 400 in the PC 140. The check box 402 is an example of a reception image for receiving, from the user, an instruction to delete an audit log. The setting screen 400 is an example of a display screen including the reception image.

Next, in step S604, in response to a request from the PC 140, the CPU 111 performs control to transmit (output) the display information for the setting screen 400 to the PC 140. Upon receipt of the display information, the PC 140 displays the setting screen 400 based on the display information. This process is an example of a display process for performing control to display the setting screen 400 as a display screen on the display unit 146. In a case where the display information is changed in step S603, the changed display information is transmitted. Thus, in this case, the check box 402 on the setting screen 400 displayed on the PC 140 is disabled so that the check box 402 cannot be selected. For example, the PC 140 can display the check box 402 in a grayed-out manner, thereby notifying the user that the check box 402 cannot be selected. In a case where the check box 402 is not disabled in step S603, the setting screen 400 on which the check box 402 can be selected (is enabled) is displayed.

As described above, in a case where a push transfer is set to enabled, the deletion of an audit log cannot be selected on the setting screen 400 for the pull transfer function. Thus, in a case where the user presses the execute button 401 in such a case, the image forming apparatus 100 receives a transfer instruction to transfer an audit log (a reception process) and transfers the audit log based on the transfer instruction, but performs control not to delete the audit log after transferring the audit log. In a case where an audit log is transferred to the server apparatus 150 by the push transfer (automatic transfer) function, the CPU 111 automatically deletes the audit log based on the automatic transfer.

As described above, in a case where a push transfer is set to enabled, the image forming apparatus 100 according to the present exemplary embodiment disables the deletion of an audit log based on a user operation. This configuration can prevent an audit log not being accumulated/stored in an external apparatus.

Figure 7:
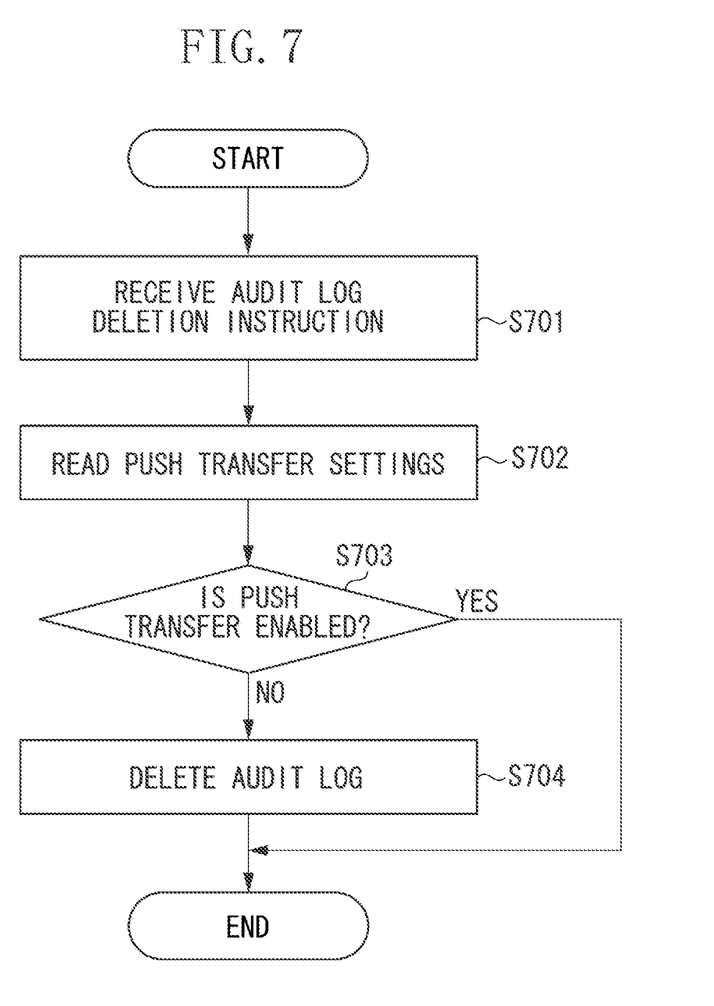
FIG. 7 is a flowchart illustrating an audit log deletion process according to a second exemplary embodiment.

Hereinafter, a second exemplary embodiment of the present invention will be described in detail. Differences between an image forming system according to the second exemplary embodiment and the image forming system according to the first exemplary embodiment will be described. FIG. 7 is a flowchart illustrating an audit log deletion process performed by the image forming apparatus 100 according to the second exemplary embodiment. In step S701, the CPU 111 of the image forming apparatus 100 receives an audit log deletion instruction from the PC 140. Next, in step S702, the CPU 111 reads the settings of a push transfer from the HDD 114.

Next, in step S703, the CPU 111 checks whether the push transfer is enabled. In a case where the push transfer is set to disabled (No in step S703), the processing proceeds to step S704. In step S704, based on the audit log deletion instruction received in step S701, the CPU 111 deletes the audit log stored in the image forming apparatus 100. In a case where the push transfer is set to enabled in step S703 (Yes in step S703), the processing ends. That is, in this case, the CPU 111 does not delete the audit log based on the audit log deletion instruction, and the processing ends. The rest of the configuration and the processing of the image forming system according to the second exemplary embodiment is similar to the configuration and the processing of the image forming system according to the first exemplary embodiment.

There is, for example, a possibility that each of a plurality of users operate the image forming apparatus 100, an audit log deletion instruction is transmitted with an input to the setting screen of the pull transfer function before a push transfer is set to enabled, and the audit log in the image forming apparatus 100 is deleted. By contrast, in a case where a push transfer is enabled, and even in a case where an audit log deletion instruction is received, the image forming apparatus 100 according to the present exemplary embodiment performs control not to delete the audit log. Thus, deletion of an audit log that has not yet been transferred can be prevented.

The present invention disclosure is not limited to the above exemplary embodiments, and can be modified and changed in various manners within the scope of the appended claims.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-000501, filed Jan. 5, 2017, which is hereby incorporated by reference herein in its entirety.

What is claimed is:

1. An image forming apparatus comprising:
a memory storing a set of instructions; and
at least one processor that executes the set of instructions to:
store an audit log;
set an automatic transmission function, for automatically transmitting the stored audit log to an external apparatus and for automatically deleting the stored audit log that has been transmitted, to enabled or disabled;
receive an execution instruction for executing a manual transmission function from a client terminal, the manual transmission function for transmitting the stored audit log to the client terminal, which is a transmission source of the execution instruction;
set a deletion function, for deleting the stored audit log in response to receiving a deletion request from a user, to enabled or disabled; and
disable, in a case where the automatic transmission function is enabled, the deletion function based on the deletion request,
wherein the disable includes change display information for a setting screen for the user to transmit the deletion request of the stored audit log on a display.

2. The image forming apparatus according to claim 1, wherein the at least one processor executes the set of instructions to, in a case where the automatic transmission function is enabled, restrict setting the deletion function to enabled.

3. The image forming apparatus according to claim 1, wherein the at least one processor executes the set of instructions to, in a case where the automatic transmission function is set to enabled, output information indicating that the audit log is not deletable.

4. The image forming apparatus according to claim 1, wherein the at least one processor executes the set of instructions to:
display the setting screen for enabling the deletion function on the display, and
prevent, in a case where the automatic transmission function is set to enabled, an instruction to enable the deletion function to be issued via the setting screen.

5. The image forming apparatus according to claim 1, wherein the at least one processor executes the set of instructions to delete the stored audit log transmitted to the external apparatus via the automatic transmission function.

6. The image forming apparatus according to claim 1, wherein the at least one processor executes the set of instructions to, in a case where the automatic transmission function for receiving a deletion instruction to delete the stored audit log is set to enabled, restrict deletion of the stored audit log based on the deletion instruction.

7. A method for controlling an image forming apparatus, the method comprising:
storing an audit log;
setting an automatic transmission function for automatically transmitting the stored audit log to an external apparatus and for automatically deleting the stored audit log that has been transmitted to enabled or disabled;
receiving an execution instruction for executing a manual transmission function from a client terminal, the manual transmission function for transmitting the stored audit log to the client terminal, which is a transmission source of the execution instruction;
setting a deletion function for deleting the stored audit log in response to receiving a deletion request from a user to enabled or disabled; and
disabling, in a case where the automatic transmission function is enabled, the deletion function based on the deletion request,
wherein the disabling includes changing display information for a setting screen for the user to transmit the deletion request of the stored audit log on a display.

8. The method according to claim 7, further comprising, in a case where the automatic transmission function is enabled, restricting setting the deletion function to enabled.

9. The method according to claim 7, further comprising, in a case where the automatic transmission function is set to enabled, outputting information indicating that the audit log is not deletable.

10. The method according to claim 7, further comprising:
displaying the setting screen for enabling the deletion function on the display, and
preventing, in a case where the automatic transmission function is set to enabled, an instruction to enable the deletion function to be issued via the setting screen.

11. The method according to claim 7, further comprising deleting the stored audit log transmitted to the external apparatus via the automatic transmission function.

12. The method according to claim 7, further comprising, in a case where the automatic transmission function for receiving a deletion instruction to delete the stored audit log is set to enabled, restricting deletion of the stored audit log based on the deletion instruction.

13. A non-transitory computer readable storage medium storing a program that causes a computer to execute a method for controlling an image forming apparatus, the method comprising:
storing an audit log;
setting an automatic transmission function for automatically transmitting the stored audit log to an external apparatus and for automatically deleting the stored audit log that has been transmitted to enabled or disabled;
receiving an execution instruction for executing a manual transmission function from a client terminal, the manual transmission function for transmitting the stored audit log to the client terminal, which is a transmission source of the execution instruction;
setting a deletion function for deleting the stored audit log in response to receiving a deletion request from a user to enabled or disabled; and
disabling, in a case where the automatic transmission function is enabled, the deletion function based on the deletion request,
wherein the disabling includes changing display information for a setting screen for the user to transmit the deletion request of the stored audit log on a display.

14. The non-transitory computer readable storage medium according to claim 13, further comprising, in a case where the automatic transmission function is enabled, restricting setting the deletion function to enabled.

15. The non-transitory computer readable storage medium according to claim 13, further comprising, in a case where the automatic transmission function is set to enabled, outputting information indicating that the audit log is not deletable.

16. The non-transitory computer readable storage medium according to claim 13, further comprising:
displaying the setting screen for enabling the deletion function on the display, and
preventing, in a case where the automatic transmission function is set to enabled, an instruction to enable the deletion function to be issued via the setting screen.

17. The non-transitory computer readable storage medium according to claim 13, further comprising deleting the stored audit log transmitted to the external apparatus via the automatic transmission function.

18. The non-transitory computer readable storage medium according to claim 13, further comprising, in a case where the automatic transmission function for receiving a deletion instruction to delete the stored audit log is set to enabled, restricting deletion of the stored audit log based on the deletion instruction.

* * * * *